United States Patent
Kakeda et al.

(10) Patent No.: US 12,115,984 B2
(45) Date of Patent: Oct. 15, 2024

(54) VEHICLE CONTROL DEVICE, VEHICLE CONTROL METHOD, AND NON-TRANSITORY COMPUTER-READABLE RECORDING MEDIUM RECORDING PROGRAM

(71) Applicant: Honda Motor Co., Ltd., Tokyo (JP)

(72) Inventors: Takafumi Kakeda, Saitama (JP); Masashi Ogawa, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 363 days.

(21) Appl. No.: 17/541,185

(22) Filed: Dec. 2, 2021

(65) Prior Publication Data
US 2022/0176956 A1     Jun. 9, 2022

(30) Foreign Application Priority Data
Dec. 3, 2020   (JP) ................ 2020-200955

(51) Int. Cl.
*B60W 30/12*     (2020.01)
*B60W 50/08*     (2020.01)
*B60W 50/10*     (2012.01)

(52) U.S. Cl.
CPC .......... *B60W 30/12* (2013.01); *B60W 50/085* (2013.01); *B60W 50/10* (2013.01); *B60W 2540/10* (2013.01); *B60W 2540/12* (2013.01); *B60W 2540/18* (2013.01); *B60W 2540/223* (2020.02); *B60W 2552/53* (2020.02); *B60W 2710/18* (2013.01); *B60W 2710/20* (2013.01); *B60W 2720/106* (2013.01); *B60W 2720/125* (2013.01)

(58) Field of Classification Search
CPC .................................................. B60W 30/12
See application file for complete search history.

(56) References Cited

U.S. PATENT DOCUMENTS

2013/0063595 A1*  3/2013  Niem .............. B60W 30/18145
                                                 348/148
2016/0272202 A1*  9/2016  Inomata ................ B60W 30/12

FOREIGN PATENT DOCUMENTS

JP    2015101240    6/2015
JP    2020011562    1/2020

OTHER PUBLICATIONS

"Office Action of Japan Counterpart Application" with English translation thereof, issued on Jul. 5, 2022, p. 1-p. 6.

* cited by examiner

*Primary Examiner* — Imran K Mustafa
(74) *Attorney, Agent, or Firm* — JCIPRNET

(57) ABSTRACT

A vehicle control device includes: a first obtaining part obtaining gripping information indicating a driver of a vehicle is gripping a steering wheel; a second obtaining part obtaining operation information indicating the driver is performing a driving operation; a recognition part recognizing a road marking line of a lane traveled by the vehicle; and a support part providing a support so that the vehicle does not deviate from the road marking line when a deviation probability is greater than or equal to a predetermined degree. The support part delays an operation of the support when the gripping information is obtained and the operation information is not obtained, as compared with a case where the gripping information and the operation information are not obtained, and suppresses the operation of the support for a predetermined time when the operation information is obtained regardless of whether the gripping information is obtained.

18 Claims, 8 Drawing Sheets

T05＞T04＞T03orT02＞T01

| Item | Function | Operation TTLC [s] |
|---|---|---|
| 01 | RDM for white line | T01 |
| 02 | RDM for road boundary | T02 |
| 03 | RDM for oncoming vehicle | T03 |
| 04 | LCCM (direction indicator not turned on) | T04 |
| 05 | LCCM (direction indicator turned on) | T05 |

FIG. 6

T05＞T04＞T03orT02＞T01    k is 1 or less

| Item | Function | Operation TTLC [s] |
|---|---|---|
| 11 | RDM for white line | T01 × k |
| 12 | RDM for road boundary | T02 × k |
| 13 | RDM for oncoming vehicle | T03 × k |
| 14 | LCCM (direction indicator not turned on) | T04 × k |
| 15 | LCCM (direction indicator turned on) | T05 × k |

FIG. 7

T14＞T13＞T12orT11

| Item | Operation of driver | Suppression time of operation |
|---|---|---|
| 21 | Operation of the direction indicator | T14 |
| 22 | Operation of the accelerator (operation of the accelerator pedal) | T12 |
| 23 | Operation of the brake (Operation of the brake pedal) | T13 |
| 24 | Operation of the steering wheel | T11 |

FIG. 8

VEHICLE CONTROL DEVICE, VEHICLE CONTROL METHOD, AND NON-TRANSITORY COMPUTER-READABLE RECORDING MEDIUM RECORDING PROGRAM

CROSS-REFERENCE TO RELATED APPLICATION

This application claims the priority benefit of Japan application serial no. 2020-200955, filed on Dec. 3, 2020. The entirety of the above-mentioned patent application is hereby incorporated by reference herein and made a part of this specification.

BACKGROUND

Technical Field

The disclosure relates to a vehicle control device, a vehicle control method, and a non-transitory computer-readable recording medium recording a program.

Description of Related Art

Conventionally, a lane deviation avoidance device is disclosed that vibrates the steering wheel and executes lane deviation avoidance control when the control execution condition, satisfied in a case where the probability that the vehicle deviates from the traveling lane is high, is satisfied and when the traveling lane is a straight road (see, for example, Patent Document 1).

RELATED ART

Patent Document

[Patent Document 1] Japanese Laid-open No. 2020-011562

However, the occupant may feel a sense of discomfort with the above technique.

The disclosure has been made in consideration of such circumstances, and provides a vehicle control device, a vehicle control method, and a non-transitory computer-readable recording medium recording a program that suppress giving a sense of discomfort to the occupant.

SUMMARY

A vehicle control device, a vehicle control method, and a non-transitory computer-readable recording medium recording a program according to the disclosure adopt the following configurations.

(1): A vehicle control device includes: a first obtaining part that obtains gripping information indicating that a driver of a vehicle is gripping a steering wheel; a second obtaining part that obtains operation information indicating that the driver is performing an operation related to driving the vehicle; a recognition part that recognizes a road marking line of a lane in which the vehicle travels; and a support part that provides a support so that the vehicle does not deviate from the road marking line when a probability that the vehicle deviates from the road marking line is greater than or equal to a predetermined degree, wherein when the gripping information is obtained and the operation information is not obtained, the support part delays an operation of the support as compared with a case where the gripping information and the operation information are not obtained, and when the operation information is obtained, the support part suppresses the operation of the support for a predetermined time regardless of whether the gripping information is obtained.

BRIEF DESCRIPTION OF THE DRAWINGS

FIG. 6 is a diagram for illustrating the normal operation.

FIG. 7 is a diagram for illustrating a delay in the operation.

FIG. 8 is a diagram for illustrating the suppression of the operation.

Figure 1:
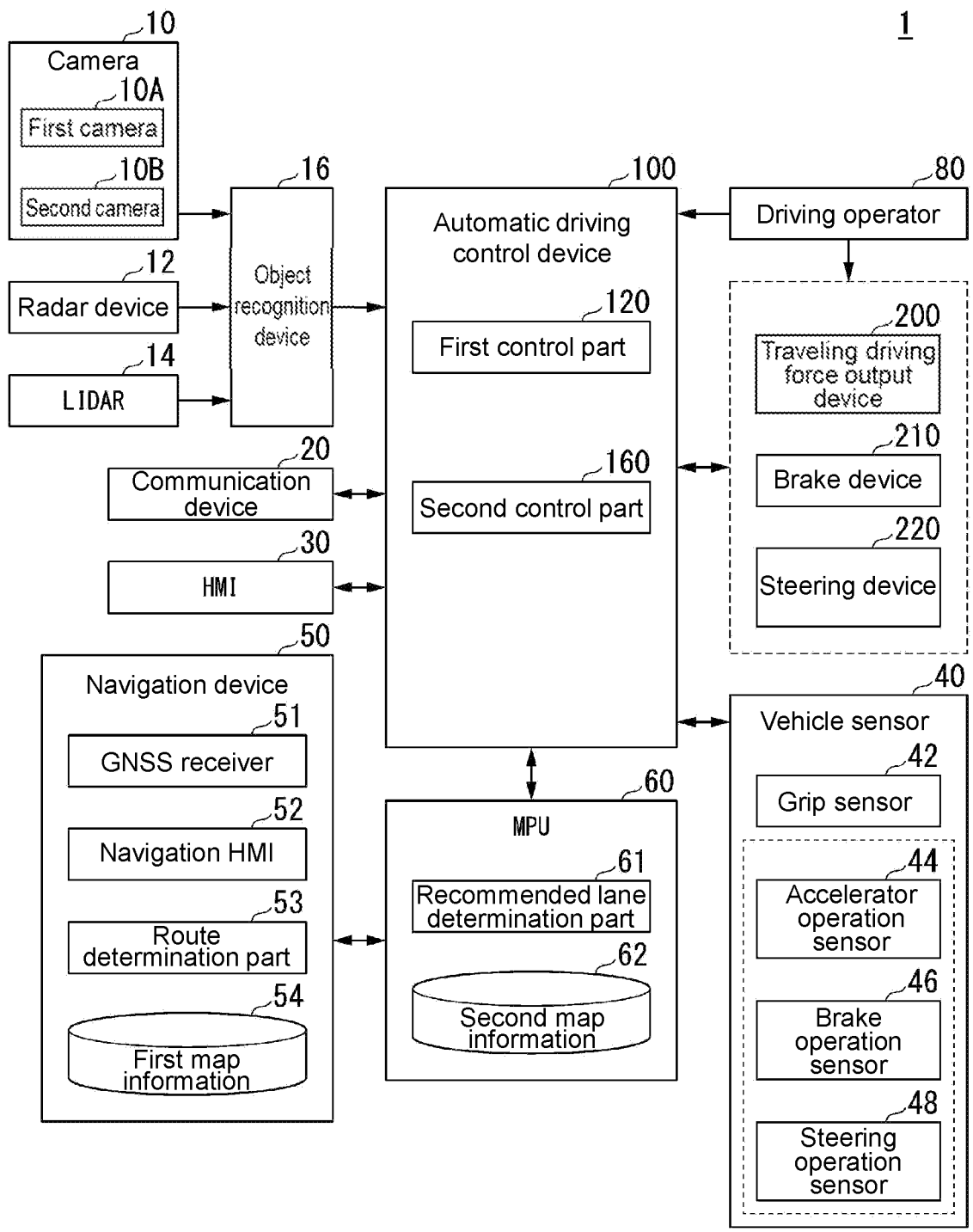
FIG. 1 is a configuration diagram of a vehicle system 1 using a vehicle control device according to the embodiment.

DESCRIPTION OF THE EMBODIMENTS (2): In the aspect of the above (1), the operation related to driving includes an operation of operating a direction indicator, an operation of controlling acceleration and deceleration of the vehicle, an operation of controlling braking of the vehicle, and an operation of the steering wheel of the vehicle.

(3): In the aspect of the above (2), when operation information indicating that the direction indicator has been operated is obtained, the support part suppresses the operation of the support with the predetermined time set to a longer time as compared with a case where the operation information indicating one or more of the operation of controlling the acceleration and deceleration of the vehicle, the operation of controlling the braking of the vehicle, or the operation of the steering wheel of the vehicle is obtained.

(4): In the aspect of the above (1), the operation related to driving includes an operation of controlling acceleration and deceleration of the vehicle, an operation of controlling braking of the vehicle, or an operation of the steering wheel of the vehicle.

(5): In the aspect of the above (4), when the operation information indicating the operation of controlling the braking of the vehicle is obtained, the support part suppresses the operation of the support with the predetermined time set to a longer time as compared with a case where the operation information indicating the operation of controlling the acceleration and deceleration of the vehicle or the operation of the steering wheel of the vehicle is obtained.

(6): In the aspect of any one of the above (1) to (5), the support part provides the support so that the vehicle does not deviate from the road marking line when the probability that the vehicle deviates from the road marking line is greater than or equal to the predetermined degree after the predetermined time elapses.

(7): A vehicle control device includes: an obtaining part that obtains operation information indicating that a driver of a vehicle is performing an operation related to driving the vehicle; a recognition part that recognizes a road marking line of a lane in which the vehicle travels; and a support part that provides a support so that the vehicle does not deviate from the road marking line when a probability that the vehicle deviates from the road marking line is greater than or equal to a predetermined degree, wherein when the operation information is obtained, the support part suppresses an operation of the support as compared with a case where the operation information is not obtained.

(8): In the aspect of any one of the above (1) to (7), the operation information is a plurality pieces of information including information indicating an operation of operating a direction indicator, information indicating an operation of controlling acceleration and deceleration of the vehicle, information indicating an operation of controlling braking of the vehicle, and information indicating an operation of a steering wheel of the vehicle, and when suppressing the operation of the support, the support part varies a degree of the suppression according to a type of the operation information.

(9): In a vehicle control method according to an aspect of the disclosure, a computer: recognizes a road marking line of a lane in which a vehicle travels; provides a support so that the vehicle does not deviate from the road marking line when a probability that the vehicle deviates from the road marking line is greater than or equal to a predetermined degree; when gripping information indicating that a driver of the vehicle is gripping a steering wheel is obtained and operation information indicating that the driver is performing an operation related to driving the vehicle is not obtained, delays an operation of the support as compared with a case where the gripping information and the operation information are not obtained; and when the operation information is obtained, suppresses the operation of the support for a predetermined time regardless of whether the gripping information is obtained.

(10): In a non-transitory computer-readable recording medium recording a program according to an aspect of the disclosure, a computer is made to perform: a processing of recognizing a road marking line of a lane in which a vehicle travels; a processing of providing a support so that the vehicle does not deviate from the road marking line when a probability that the vehicle deviates from the road marking line is greater than or equal to a predetermined degree; when gripping information indicating that a driver of the vehicle is gripping a steering wheel is obtained and operation information indicating that the driver is performing an operation related to driving the vehicle is not obtained, a processing of delaying an operation of the support as compared with a case where the gripping information and the operation information are not obtained; and when the operation information is obtained, a processing of suppressing the operation of the support for a predetermined time regardless of whether the gripping information is obtained.

According to (1), (2), (4), (7), (9), and (10), by providing the support so that the vehicle does not deviate from the road marking line appropriately according to the driver's condition, the vehicle control device can suppress giving a sense of discomfort to the occupant of the vehicle.

According to (3), the vehicle control device can perform control that more reliably reflects the driver's intention to change lanes. When the driver is operating the direction indicator, the intention to change lanes is clear, and the support is suppressed while the lane change is expected to be carried out. Therefore, the driver can change lanes without any sense of discomfort.

According to (5), the vehicle control device can perform control that more reliably reflects the driver's intention. When the driver performs an operation that controls the braking, it is predicted that the driver intends to deviate from the road marking line in order to avoid obstacles or to change lanes, and the support control is suppressed. In this way, the driver can avoid obstacles and change lanes without any sense of discomfort.

According to (6), the vehicle control device provides the support so that the vehicle does not to deviate from the road marking line when the probability that the vehicle deviates from the road marking line is greater than or equal to the predetermined degree after the predetermined time elapses. In this way, the convenience for the driver is improved by providing the support when the driver's intention has changed.

According to (8), when suppressing the operation of the support, the vehicle control device can start the operation of the support at an appropriate timing while suppressing giving a sense of discomfort to the occupant by varying the degree of suppression according to the type of operation information.

Hereinafter, embodiments of a vehicle control device, a vehicle control method, and a non-transitory computer-readable recording medium recording a program of the disclosure will be described with reference to the drawings.

First Embodiment

[Overall Configuration]

FIG. 1 is a configuration diagram of a vehicle system 1 using a vehicle control device according to the embodiment. The vehicle on which the vehicle system 1 is mounted is, for example, a vehicle such as a two-wheeled vehicle, a three-wheeled vehicle, or a four-wheeled vehicle, and the drive source thereof is an internal combustion engine such as a diesel engine or a gasoline engine, an electric motor, or a combination thereof. The electric motor operates by using the electric power generated by a generator connected to the internal combustion engine or the electric power generated by a secondary battery or a fuel cell.

The vehicle system 1 includes, for example, a camera 10, a radar device 12, a light detection and ranging (LIDAR) 14, an object recognition device 16, a communication device 20, a human machine interface (HMI) 30, a vehicle sensor 40, a navigation device 50, a map positioning unit (MPU) 60, a driving operator 80, an automatic driving control device 100, a traveling driving force output device 200, a brake device 210, and a steering device 220. These devices and equipment are connected to one another by a multiplex communication line such as a controller area network (CAN) communication line, a serial communication line, a wireless communication network, or the like. Further, the configuration shown in FIG. 1 is merely an example, and a part of the configuration may be omitted or another configuration may be added.

The camera 10 includes a first camera 10A and a second camera 10B. The first camera 10A and the second camera 10B are, for example, digital cameras using a solid-state photographing device such as a charge coupled device (CCD) or a complementary metal oxide semiconductor (CMOS). The first camera 10A and the second camera 10B are attached to any position of the vehicle (hereinafter referred to as the vehicle M) on which the vehicle system 1 is mounted. The first camera 10A is attached to, for example, the upper part of the front windshield, the back surface of the rearview mirror, or the like. The first camera 10A photographs the front of the vehicle M. The second camera 10B is attached to, for example, the rear window, the rear bumper, or the like. The second camera 10B is a camera that photographs the rear of the vehicle M. The first camera 10A and the second camera 10B cyclically and repeatedly photograph the periphery of the vehicle M, for example. The first camera 10A or the second camera 10B may be a stereo camera.

The radar device 12 radiates radio waves such as millimeter waves in the periphery of the vehicle M, and detects radio waves (reflected waves) reflected by an object to detect at least the position (distance and orientation) of the object. The radar device 12 is attached to any position of the vehicle M. The radar device 12 may detect the position and speed of the object by the frequency modulated continuous wave (FM-CW) method.

The LIDAR 14 irradiates the periphery of the vehicle M with light (or an electromagnetic wave having a wavelength close to that of light) and measures the scattered light. The LIDAR 14 detects the distance to a target based on the time from light emission to light reception. The emitted light is, for example, a pulsed laser beam. The LIDAR 14 is attached to any position of the vehicle M.

The object recognition device 16 performs sensor fusion processing on the detection results of a part or all of the camera 10, the radar device 12, and the LIDAR 14, and recognizes the position, type, speed, and the like of the object. The object recognition device 16 outputs the recognition result to the automatic driving control device 100. The object recognition device 16 may output the detection results of the camera 10, the radar device 12, and the LIDAR 14 to the automatic driving control device 100 as they are. The object recognition device 16 may be omitted from the vehicle system 1.

The communication device 20 communicates with other vehicles existing in the periphery of the vehicle M, or communicates with various server devices via a radio base station by using, for example, a cellular network, a Wi-Fi network, Bluetooth (registered trademark), dedicated short range communication (DSRC), or the like.

The HMI 30 presents various information to an occupant of the vehicle M and accepts input operations by the occupant. The HMI 30 includes various display devices, speakers, buzzers, touch panels, switches, keys and the like.

[Vehicle Sensor]

The vehicle sensor 40 includes a vehicle speed sensor that detects the speed of the vehicle M, an acceleration sensor that detects the acceleration, a yaw rate sensor that detects the angular velocity around the vertical axis, an orientation sensor that detects the orientation of the vehicle M, and the like. The vehicle sensor 40 further includes a grip sensor 42, an accelerator operation sensor 44, a brake operation sensor 46, a steering operation sensor 48, and the like.

When the driver is gripping the steering wheel, the grip sensor 42 provides the automatic driving control device 100 with information indicating that the driver is gripping the steering wheel. The grip sensor 42 provides the automatic driving control device 100 with information indicating the degree of change in capacitance (or resistance value) that changes depending on the area in contact with the hand or the like. The information that the degree of change in capacitance is greater than or equal to a threshold value is, for example, the information indicating that the driver is gripping the steering wheel.

When the driver is operating the accelerator pedal, the accelerator operation sensor 44 provides the automatic driving control device 100 with information indicating that the driver is operating the accelerator pedal. The accelerator operation sensor 44 detects the opening degree of the accelerator pedal and provides the detection result to the automatic driving control device 100. The information that the accelerator pedal opening degree is greater than or equal to a threshold value is, for example, the information indicating that the driver is operating the accelerator pedal.

When the driver is operating the brake pedal, the brake operation sensor 46 provides the automatic driving control device 100 with information indicating that the driver is operating the brake pedal. The brake operation sensor 46 detects the treading force on the brake pedal and provides the detection result to the automatic driving control device 100. The information that the treading force on the brake pedal is greater than or equal to a threshold value is, for example, the information indicating that the driver is operating the brake pedal. Further, in the case of a vehicle in which acceleration, deceleration, and braking are operated only by the accelerator pedal, the brake operation sensor 46 may be omitted.

When the driver is operating the steering wheel, the steering operation sensor 48 provides the automatic driving control device 100 with information indicating that the driver is operating the steering wheel. The steering operation sensor 48 is a torque sensor that detects the steering torque acting on the steering shaft or a steering sensor that detects the rotation angle of the steering shaft. The steering operation sensor 48 detects the steering torque or the rotation angle, and provides the detection result to the automatic driving control device 100. The information that the steering torque or the rotation angle is greater than or equal to a threshold value is, for example, the information indicating that the driver is operating the steering wheel.

The navigation device 50 includes, for example, a global navigation satellite system (GNSS) receiver 51, a navigation HMI 52, and a route determination part 53. The navigation device 50 holds first map information 54 in a storage device such as a hard disk drive (HDD) or a flash memory. The GNSS receiver 51 specifies the position of the vehicle M based on the signal received from the GNSS satellite. The position of the vehicle M may be specified or complemented by an inertial navigation system (INS) using the output of the vehicle sensor 40. The navigation HMI 52 includes display devices, speakers, touch panels, keys, and the like. The navigation HMI 52 may be partially or wholly shared with the above-mentioned HMI 30. The route determination part 53, for example, refers to the first map information 54 to determine a route (hereinafter referred to as the route on the map) from the position of the vehicle M specified by the GNSS receiver 51 (or any input position) to a destination input by the occupant using the navigation HMI 52. The first map information 54 is, for example, information in which the road shape is expressed by links indicating roads and nodes connected by the links. The first map information 54 may include the road curvature, point of interest (POI) information, and the like. The route on the map is output to the MPU 60. The navigation device 50 may provide route guidance using the navigation HMI 52 based on the route on the map. The navigation device 50 may be realized by, for example, the function of a terminal device such as a smartphone or a tablet terminal owned by the occupant. The navigation device 50 may transmit the current position and the destination to the navigation server via the communication device 20 and obtain a route equivalent to the route on the map from the navigation server.

The MPU 60 includes, for example, a recommended lane determination part 61, and holds second map information 62 in a storage device such as an HDD or a flash memory. The recommended lane determination part 61 divides the route on the map provided by the navigation device 50 into multiple blocks (for example, every 100 m with respect to the vehicle traveling direction), and refers to the second map information 62 to determine the recommended lane for each block. The recommended lane determination part 61 determines which lane from the left to drive. When a branch point exists on the route on the map, the recommended lane determination part 61 determines the recommended lane so that the vehicle M can travel on a reasonable route to proceed to the branch destination.

The second map information 62 is more accurate map information than the first map information 54. The second map information 62 includes, for example, information on the center of the lane, information on the boundary of the lane, and the like. Further, the second map information 62 may include road information, traffic regulation information, address information (address/zip code), facility information, telephone number information, and the like. The second map information 62 may be updated at any time by the communication device 20 communicating with another device. The second map information 62 stores information indicating the position and range of the zebra zone (conduction zone). The zebra zone is a road marking for guiding the traveling of a vehicle. The zebra zone is, for example, a marking represented by a striped pattern.

The driving operator 80 includes, for example, an accelerator pedal, a brake pedal, a shift lever, a steering wheel, a steering wheel variant, a joystick, and other operators. A sensor for detecting the amount of operation or the presence or absence of operation is attached to the driving operator 80, and the detection result is output to a part or all of the automatic driving control device 100, the traveling driving force output device 200, the brake device 210, and the steering device 220.

The automatic driving control device 100 includes, for example, a first control part 120 and a second control part 160. The first control part 120 and the second control part 160 are realized by, for example, a hardware processor such as a central processing unit (CPU) executing a program (software). In addition, a part or all of these components may be realized by hardware (circuit part; including circuitry) such as a large scale integration (LSI), an application specific integrated circuit (ASIC), a field-programmable gate array (FPGA), or a graphics processing unit (GPU), or may be realized by collaboration between software and hardware. A program may be stored in advance in a storage device (a storage device including a non-transitory storage medium) such as an HDD or a flash memory of the automatic driving control device 100, or may be stored in a removable storage medium such as a DVD or a CD-ROM, and the storage medium (a non-transitory storage medium) may be installed in the HDD or the flash memory of the automatic driving control device 100 by being attached to the drive device. The automatic driving control device 100 is an example of the "vehicle control device."

[First Control Part]

Figure 2:
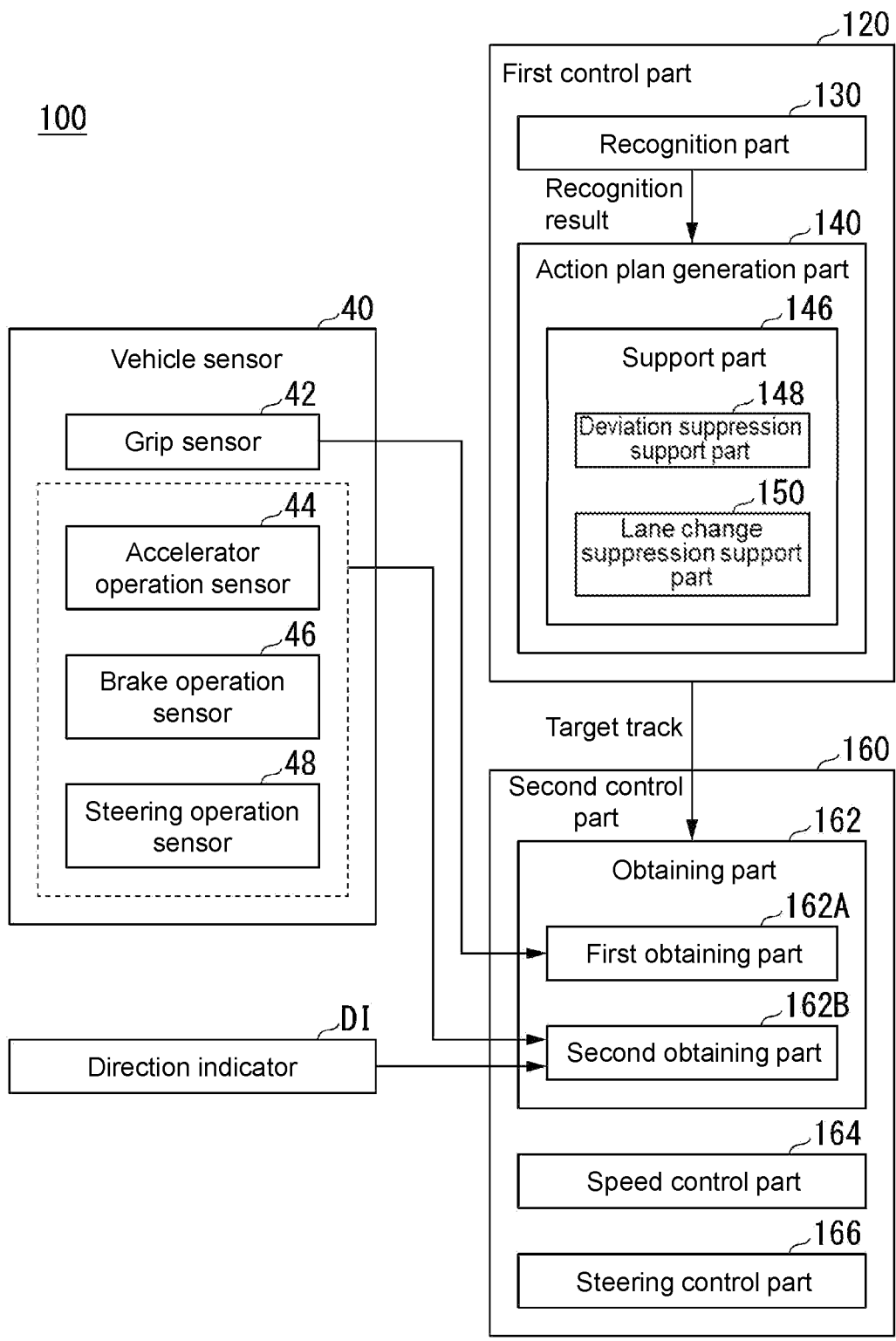
FIG. 2 is a functional configuration diagram of the first control part 120 and the second control part 160.

FIG. 2 is a functional configuration diagram of the first control part 120 and the second control part 160. The first control part 120 includes, for example, a recognition part 130 and an action plan generation part 140. The first control part 120, for example, realizes a function by artificial intelligence (AI) and a function by a model given in advance in parallel. For example, the function of "recognizing an intersection" may be executed in parallel with the recognition of an intersection by deep learning or the like and the recognition based on predetermined conditions (there are signals, road markings, and the like that can be pattern matched), and may be realized by scoring both ways and making a comprehensive evaluation. In this way, the reliability of automatic driving is ensured.

The recognition part 130 recognizes the position, speed, acceleration, and other states of an object in the periphery of the vehicle M based on the information input from the camera 10, the radar device 12, and the LIDAR 14 via the object recognition device 16. The position of the object is recognized as, for example, a position on absolute coordinates with a representative point (center of gravity, center of drive axis, or the like) of the vehicle M as the origin, and is used for control. The position of the object may be represented by a representative point such as the center of gravity or a corner of the object, or may be represented by a represented area. The "state" of the object may include the acceleration or jerk of the object, or the "behavioral state" (for example, whether it is changing lanes or is about to change lanes).

The recognition part 130 recognizes, for example, the lane (traveling lane) in which the vehicle M is traveling. For example, the recognition part 130 recognizes the traveling lane by comparing a road marking line pattern (for example, the arrangement of solid lines and broken lines) obtained from the second map information 62 and a road marking line pattern in the periphery of the vehicle M recognized from the image photographed by the camera 10. Further, the recognition part 130 may recognize the traveling lane by recognizing not only the road marking line but also the traveling road boundary (road boundary) including the road marking line, the road shoulder, the curb, the median strip, the guardrail, and the like. In this recognition, the position of the vehicle M obtained from the navigation device 50 and the processing result by the INS may be added. Further, the recognition part 130 also recognizes stop lines, obstacles, red lights, tollhouses, and other road events.

When recognizing the traveling lane, the recognition part 130 recognizes the position and posture of the vehicle M with respect to the traveling lane. The recognition part 130 may recognize, for example, the deviation of the reference point of the vehicle M from the center of the lane and the angle formed with respect to a line connecting the center of the lane in the traveling direction of the vehicle M as the relative position and posture of the vehicle M with respect to the traveling lane. Alternatively, the recognition part 130 may recognize the position of the reference point of the vehicle M with respect to any side end part (the road marking line or the road boundary) of the traveling lane as the relative position of the vehicle M with respect to the traveling lane.

The action plan generation part 140 generates a target track in which the vehicle M will automatically travel in the future (without relying on the driver's operation) so that in principle, the vehicle M can travel in the recommended lane determined by the recommended lane determination part 61, and is further able to respond to the conditions in the periphery of the vehicle M. The target track includes, for example, a speed element. For example, the target track is represented as a sequence of points (track points) to be reached by the vehicle M. The track point is a point to be reached by the vehicle M for each predetermined mileage (for example, about several meters) along the road, and separately, a target speed and a target acceleration for each predetermined sampling time (for example, about some tenths of a second) are generated as a part of the target track. Further, the track point may be a position to be reached by the vehicle M at the sampling time for each predetermined sampling time. In this case, the information of the target speed and the target acceleration is expressed by the interval of the track points.

The action plan generation part 140 may set an automatic driving event when generating the target track. The automatic driving event include a constant speed traveling event, a low speed following traveling event, a lane change event, a branching event, a merging event, a takeover event, and the like. The action plan generation part 140 generates the target track according to the activated event.

The action plan generation part 140 includes, for example, a support part 146. The support part 146 provides a support so that the vehicle does not deviate from the road marking line when the probability that the vehicle deviates from the road marking line is greater than or equal to a predetermined degree. That the probability that the vehicle M deviates from the lane is greater than or equal to a predetermined degree means that the vehicle M moves in a tendency to deviate from the lane and the relationship between the reference position (for example, the tire) of the vehicle M and the lane is a predetermined relationship (for example, the relationship that the reference position and the lane are close to each other). The support is to output an alarm or to automatically control the steering of the vehicle M. The alarm is a sound, an image, a vibration or the like that indicates to the driver that the vehicle M is likely to deviate from the lane, or a sound, an image, a vibration, or the like that urges the driver to control the vehicle M so as not to deviate from the lane. To automatically control the steering of the vehicle M is to automatically control the steering so that the vehicle M does not deviate from the lane or the vehicle M approaches the center side of the lane.

When the gripping information is obtained and the operation information is not obtained, the support part 146 delays the operation of the support as compared with the case where the gripping information and the operation information are not obtained. The gripping information and the operation information are provided by the second control part 160, which will be described later.

The support part 146 includes, for example, a deviation suppression support part 148 and a lane change suppression support part 150. The deviation suppression support part 148 suppresses the vehicle M from deviating from the lane when the probability that the vehicle M deviates from the lane is greater than or equal to a predetermined degree (hereinafter referred to as when the first condition is satisfied).

Figure 3:
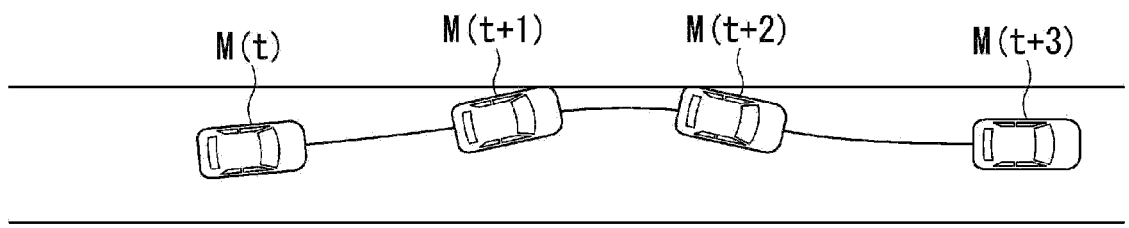
FIG. 3 is a diagram showing an example of a scene in which the deviation suppression support part 148 controls the vehicle M.

FIG. 3 is a diagram showing an example of a scene in which the deviation suppression support part 148 controls the vehicle M. The deviation suppression support part 148 causes the HMI 30 to output an alarm when the first condition is satisfied. Further, the deviation suppression support part 148 controls the steering so that the vehicle M moves toward the center of the lane when the first condition is satisfied. For example, the deviation suppression support part 148 controls the steering so that the vehicle M moves toward the center of the lane when the state in which the first condition is satisfied is not resolved after the alarm is output. The control executed by the deviation suppression support part 148 may be referred to as "road departure mitigation (RDM)."

The lane change suppression support part 150 suppresses the vehicle M from deviating from the lane when the probability that vehicle M will enter the adjacent lane is greater than or equal to a predetermined degree (for example, when it tries to change lanes to the adjacent lane) and when another vehicle exists behind the vehicle M and at a predetermined distance from the vehicle M in the adjacent lane (hereinafter referred to as when the second condition is satisfied). That the probability that the vehicle M will enter the adjacent lane is greater than or equal to a predetermined degree means that the vehicle M moves in a tendency to enter the adjacent lane and the relationship between the reference position (for example, the tire) of the vehicle M and the lane is a predetermined relationship (for example, the relationship that the reference position and the lane are close to each other).

Figure 4:
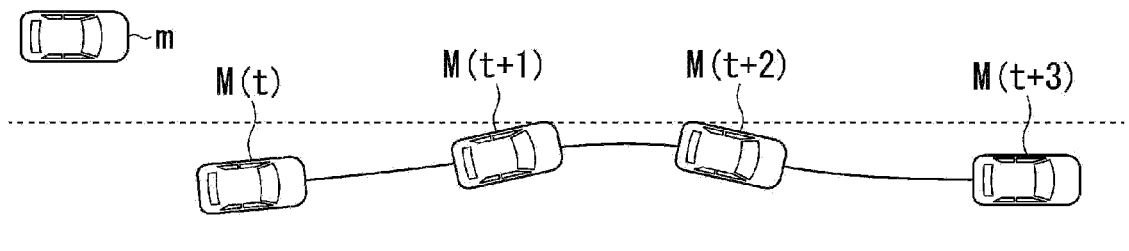
FIG. 4 is a diagram showing an example of a scene in which the lane change suppression support part 150 controls the vehicle M.

FIG. 4 is a diagram showing an example of a scene in which the lane change suppression support part 150 controls the vehicle M. The lane change suppression support part 150 causes the HMI 30 to output an alarm when the second condition is satisfied. Further, the deviation suppression support part 148 controls the steering so that the vehicle M moves toward the center of the lane when the second condition is satisfied. For example, the deviation suppression support part 148 controls the steering so that the vehicle M moves toward the center of the lane when the state in which the second condition is satisfied is not resolved after the alarm is output. The control executed by the lane change suppression support part 150 may be referred to as "lane change collision mitigation (LCCM)."

[Second Control Part]

The second control part 160 controls the traveling driving force output device 200, the brake device 210, and the steering device 220 so that the vehicle M passes the target track generated by the action plan generation part 140 at the scheduled time.

The second control part 160 includes, for example, an obtaining part 162, a speed control part 164, and a steering control part 166. The obtaining part 162 obtains the information of the target track (orbit point) generated by the action plan generation part 140 and stores it in a memory (not shown). The speed control part 164 controls the traveling driving force output device 200 or the brake device 210 based on a speed element associated with the target track stored in the memory. The steering control part 166 controls the steering device 220 according to the curvature of the target track stored in the memory. The processing of the speed control part 164 and the steering control part 166 is realized by, for example, a combination of feedforward control and feedback control. For example, the steering control part 166 executes a combination of feedforward control according to the curvature of the road in front of the vehicle M and feedback control based on the deviation from the target track.

Further, the obtaining part 162 includes, for example, a first obtaining part 162A and a second obtaining part 162B. The first obtaining part 162A obtains the gripping information indicating that the driver of the vehicle is gripping the steering wheel. The second obtaining part 162B obtains the operation information indicating that the driver is performing an operation related to driving the vehicle. The operation related to driving includes one or more of an operation of operating a direction indicator DI, an operation of controlling acceleration/deceleration of the vehicle, an operation of controlling braking of the vehicle, or an operation of the steering wheel of the vehicle. When the operation information is obtained, the steering control part 166 suppresses the operation of the support for a predetermined time regardless of whether the gripping information is obtained. The functional part including the support part 146 and the steering control part 166 is an example of the "support part" in the claims. Further, a part or all of the processing executed by the first control part 120 may be executed by the second control part 160, and a part or all of the processing executed by the second control part 160 may be executed by the first control part 120.

Instead of determining whether the driver is gripping the steering wheel or whether the driver is performing a driving operation based on the information provided by the vehicle sensor 40, the automatic driving control device 100 may determine whether the driver is gripping the steering wheel or whether the driver is performing the driving operation based on an image photographed by a camera provided in the vehicle interior. The vehicle interior camera photographs, for example, the driver's arms, hands, and feet. The automatic driving control device 100 may analyze the image photographed by the vehicle interior camera, extract the behavior of the driver, and make the above determination based on the extracted behavior.

With reference back to FIG. 1, the traveling driving force output device 200 outputs to the drive wheel a traveling driving force (torque) for the vehicle to travel. The traveling driving force output device 200 includes, for example, a combination of an internal combustion engine, an electric motor, a transmission, and the like, and an electronic control unit (ECU) that controls them. The ECU controls the above configuration according to the information input from the second control part 160 or the information input from the driving operator 80.

The brake device 210 includes, for example, a brake caliper, a cylinder that transmits oil pressure to the brake caliper, an electric motor that generates oil pressure in the cylinder, and a brake ECU. The brake ECU controls the electric motor according to the information input from the second control part 160 or the information input from the driving operator 80 so that the brake torque corresponding to the braking operation is output to each wheel. The brake device 210 may include, as a backup, a mechanism for transmitting the oil pressure generated by the operation of the brake pedal included in the driving operator 80 to the cylinder via a master cylinder. Further, the brake device 210 is not limited to the configuration described above, and may be an electronically controlled oil-pressure brake device that controls an actuator according to the information input from the second control part 160 to transmit the oil pressure of the master cylinder to the cylinder.

The steering device 220 includes, for example, a steering ECU and an electric motor. The electric motor, for example, applies a force to the rack and pinion mechanism to change the direction of the steering wheel. The steering ECU drives the electric motor and changes the direction of the steering wheel according to the information input from the second control part 160 or the information input from the driving operator 80.

[Flowchart]

Figure 5:
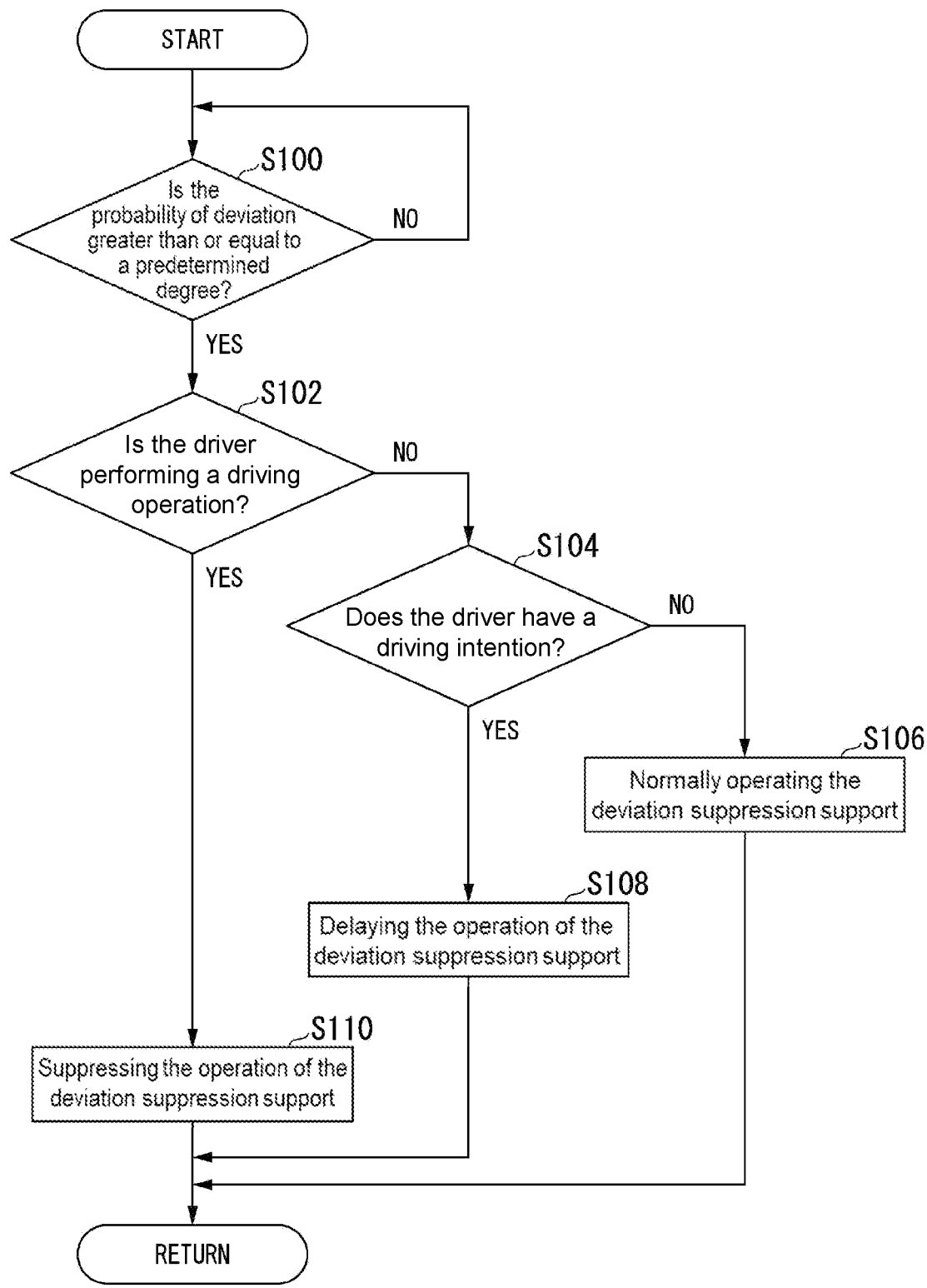
FIG. 5 is a flowchart showing an example of a processing flow executed by the support part 146.

FIG. 5 is a flowchart showing an example of a processing flow executed by the support part 146. More specifically, this processing is a processing executed by the deviation suppression support part 148 or the lane change suppression support part 150. The support provided by the deviation suppression support part 148 or the lane change suppression support part 150 is hereinafter referred to as the "deviation suppression support."

First, the support part 146 determines whether the probability that the vehicle M deviates from the lane is greater than or equal to a predetermined degree (step S100). When the probability that the vehicle M deviates from the lane is greater than or equal to a predetermined degree, the automatic driving control device 100 determines whether the driver is performing a driving operation (step S102). The automatic driving control device 100 determines that the driver is performing the driving operation when the second obtaining part 162B obtains the operation information, and determines that the driver is not performing the driving operation when the second obtaining part 162B does not obtain the operation information. The automatic driving control device 100 may consider that the driver is not performing the driving operation when the operation amount indicating the degree of operation provided by the vehicle sensor 40 is less than or equal to a threshold value.

When the driver is not performing the driving operation, the support part 146 determines whether the driver has a driving intention (step S104). The support part 146 determines that the driver has a driving intention when the first obtaining part 162A obtains the gripping information, and determines that the driver does not have a driving intention when the first obtaining part 162A does not obtain the gripping information.

For example, when the driver does not have a driving intention, the automatic driving is continued, and when the driver has a driving intention, the automatic driving is stopped and the vehicle M is controlled by the driver's operation. Further, for example, when the driver does not have a driving intention, the automatic driving is continued, but the lane change triggered by the operation of the direction indicator may not be performed, and acceleration/deceleration or steering may be automatically controlled.

When the driver does not have a driving intention, the support part 146 normally operates the deviation suppression support (step S106). FIG. 6 is a diagram for illustrating the normal operation. Hereinafter, the timing at which the deviation suppression support normally operates will be described.

(01) When the time (time to lane crossing (TTLC)) at which the vehicle M is predicted to deviate from the white line (road marking line) of the road is "T01," the RDM control is operated. The time predicted to deviate is the time when the reference position of the vehicle M is predicted to reach the target (road marking line) when the vehicle M maintains the current traveling state.

(02) When the time at which the vehicle M is predicted to deviate from the road boundary of the road is "T02," the RDM control is operated.

(03) When there is an oncoming vehicle approaching the vehicle M within a predetermined distance from the vehicle M in the oncoming lane, and the time at which the vehicle M is predicted to deviate from the road marking line of the road is "T03," the RDM control is operated.

(04) When the vehicle M is trying to execute the lane change without turning on the direction indicator, and the time at which the vehicle M is predicted to change lanes is "T04," the LCCM control is operated. The time at which the vehicle M is predicted to change lanes is the time when the reference position of the vehicle M is predicted to reach the lane of the lane change destination when the vehicle M maintains the current traveling state.

(05) When vehicle M turns on the direction indicator and is trying to execute a lane change, and the time at which the vehicle M is predicted to change lanes is "T05," the LCCM control is operated.

The length of time is in the descending order of "T05," "T04," "T03" or "T02," and "T01." "T03" and "T02" may be the same period of time or different periods of time. "T02" is, for example, a time of 1 second or longer.

The description of FIG. 5 is continued. When the driver has a driving intention, the support part 146 delays the timing at which the deviation suppression support is operated from the timing at which the deviation suppression support is normally operated (step S108). That is, when the gripping information is obtained and the operation information is not obtained, the support part 146 delays the operation of the deviation suppression support as compared with the case where the gripping information is not obtained and the operation information is not obtained.

FIG. 7 is a diagram for illustrating a delay in the operation.
(11) When the time at which the vehicle M is predicted to deviate from the white line (road marking line) of the road is "T01×k," the RDM control is operated. "k" is a coefficient less than "1."
(12) When the time at which the vehicle M is predicted to deviate from the road boundary of the road is "T02×k," the RDM control is operated.
(13) When there is an oncoming vehicle approaching the vehicle M within a predetermined distance from the vehicle M in the oncoming lane, and the time at which the vehicle M is predicted to deviate from the road marking line of the road is "T03×k," the RDM control is operated.
(14) When the vehicle M is trying to execute the lane change without turning on the direction indicator, and the time at which the vehicle M is predicted to change lanes is "T04×k," the LCCM control is operated.
(15) When vehicle M turns on the direction indicator and is trying to execute a lane change, and the time at which the vehicle M is predicted to change lanes is "T05×k," the LCCM control is operated.

In FIG. 5, when the driver is performing the driving operation, the second control part 160 suppresses the operation of the deviation suppression support (step S110). That "the operation is suppressed" means that the alarm output or steering control is not performed for a set time. After the set time has elapsed, the deviation suppression support is operated when the condition for performing the deviation suppression support is satisfied (for example, when the vehicle M is approaching the road marking line).

When the operation information indicating that the direction indicator has been operated is obtained, the second control part 160 suppresses the operation of the support with the predetermined time set to a longer time as compared with the case where the operation information indicating one or more of the operation of controlling the acceleration/deceleration of the vehicle M, the operation of controlling the braking of the vehicle M, or the operation of the steering wheel of the vehicle M is obtained.

When the operation information indicating that the direction indicator has been operated is obtained, the second control part 160 suppresses the operation of the support with the predetermined time set to a longer time as compared with the case where the operation of controlling the acceleration/deceleration of the vehicle M or the operation of the steering wheel of the vehicle M is obtained.

FIG. 8 is a diagram for illustrating the suppression of the operation.
(21) When the operation information is information indicating that the direction indicator is being operated, the operation of the RDM control or the LCCM is suppressed for a time "T14."
(22) When the operation information is information indicating that the accelerator pedal is being operated, the operation of the RDM control or the LCCM is suppressed for a time "T12."
(23) When the operation information is information indicating that the brake pedal is being operated, the operation of the RDM control or the LCCM is suppressed for a time "T13."
(24) When the operation information is information indicating that the steering wheel is being operated, the operation of the RDM control or the LCCM is suppressed for a time "T11."

The length of time is in the descending order of "T14," "T13," and "T12" or "T11." "T12" and "T11" may be the same period of time or different periods of time. The length of each of the above times may be changed as appropriate. Further, each of the above times may be changed according to the operation amount.

The timing at which the above-mentioned "T11" to "T13" counts are started may be the timing at which the operation is started or the timing at which the operation is ended. When it is the timing at which the operation is started, even if the driver continues the operation, the suppression of the deviation suppression support is released after the time corresponding to the operation elapses from the timing at which the operation is started. When it is the timing at which the operation is ended, if the driver continues the operation, the deviation suppression support is suppressed even if the time corresponding to the operation elapses from the timing at which the operation is started.

For example, when multiple operations are performed within a predetermined time, a suppression time may be set according to the types of the operations or the order of the operations. For example, when the accelerator pedal is operated and the steering wheel is operated, the time of "T12," the time of "T11," or a time different from "T12" or "T11" may be set. For example, the different time may be longer than "T12" and "T11." When multiple operations are performed within a predetermined time, a time corresponding to a preset high-priority operation may be set. The high-priority operation is, for example, an operation corresponding to the time corresponding to the operation for the longest time.

As described above, when suppressing the operation of the deviation suppression support, the second control part 160 can start the operation of the support at an appropriate timing while suppressing giving a sense of discomfort to the occupant by varying the degree of suppression of the operation according to the type of the operation information.

After the processing of step S106, step S108, or step S110, the processing of one routine of this flowchart ends. The order of the above processing may be changed. For example, when the determination in step S104 is executed and the determination result is negative, the processing in step S106 may be executed, and when the determination result in step S104 is affirmative, the determination in step S102 may be performed. Then, when the determination result of step S102 is negative, the processing of step S108 may be executed, and when the determination result of step S102 is affirmative, the processing of step S110 may be executed.

[Summary]

As described above, when the driver does not have a driving intention, the support part 146 can control the vehicle M so that the vehicle M does not deviate from the lane by operating the deviation suppression support. When the driver has a driving intention but does not perform a driving operation, the support part 146 can suppress excessive deviation suppression support by delaying the operation of the deviation suppression support. For example, when the lane width is narrow or the vehicle travels on a narrow road, excessive deviation suppression support is suppressed. In this way, it is possible to suppress giving a sense of discomfort to the occupant.

Further, when the driver is performing the driving operation, the second control part 160 can realize the control in consideration of the driver's intention by suppressing the operation of the deviation suppression support. For example, when the driver intentionally approaches the road marking line in order to avoid obstacles or change lanes, the operation of the deviation suppression support is suppressed, and it is possible to suppress the operation of the deviation suppression support contrary to the driver's intention and realize the control reflecting the driver's intention. As a result, the sense of discomfort of the occupant is suppressed. In this way, the automatic driving control device 100 can suppress giving a sense of discomfort to the occupant.

According to the first embodiment described above, the automatic driving control device 100 can suppress giving a sense of discomfort to the occupant by providing the support so that the vehicle M does not deviate from the road marking line when the probability that the vehicle M deviates from the road marking line is greater than or equal to a predetermined degree; by delaying the operation of the support when the gripping information is obtained and the operation information is not obtained as compared with the case where the gripping information and the operation information are not obtained; and by suppressing the operation of the support for a predetermined time regardless of whether the gripping information is obtained when the operation information is obtained.

Modified Example of the First Embodiment

In the first embodiment, the operation of the deviation suppression support is delayed when the driving operation is not performed but the gripping information is obtained while the operation information is not obtained, or when the operation information is obtained. However, instead of delaying, when the gripping information is obtained while the operation information is not obtained, or when the operation information is obtained, the support part 146 may reduce the output degree of the alarm or reduce the steering control amount as compared with the normal operation.

Second Embodiment

Hereinafter, a second embodiment will be described. In the first embodiment, it has been described that automatic driving for controlling acceleration/deceleration and steering is performed. In contrast, in the second embodiment, support control for supporting steering is performed. Hereinafter, the differences from the first embodiment will be mainly described.

Figure 9:
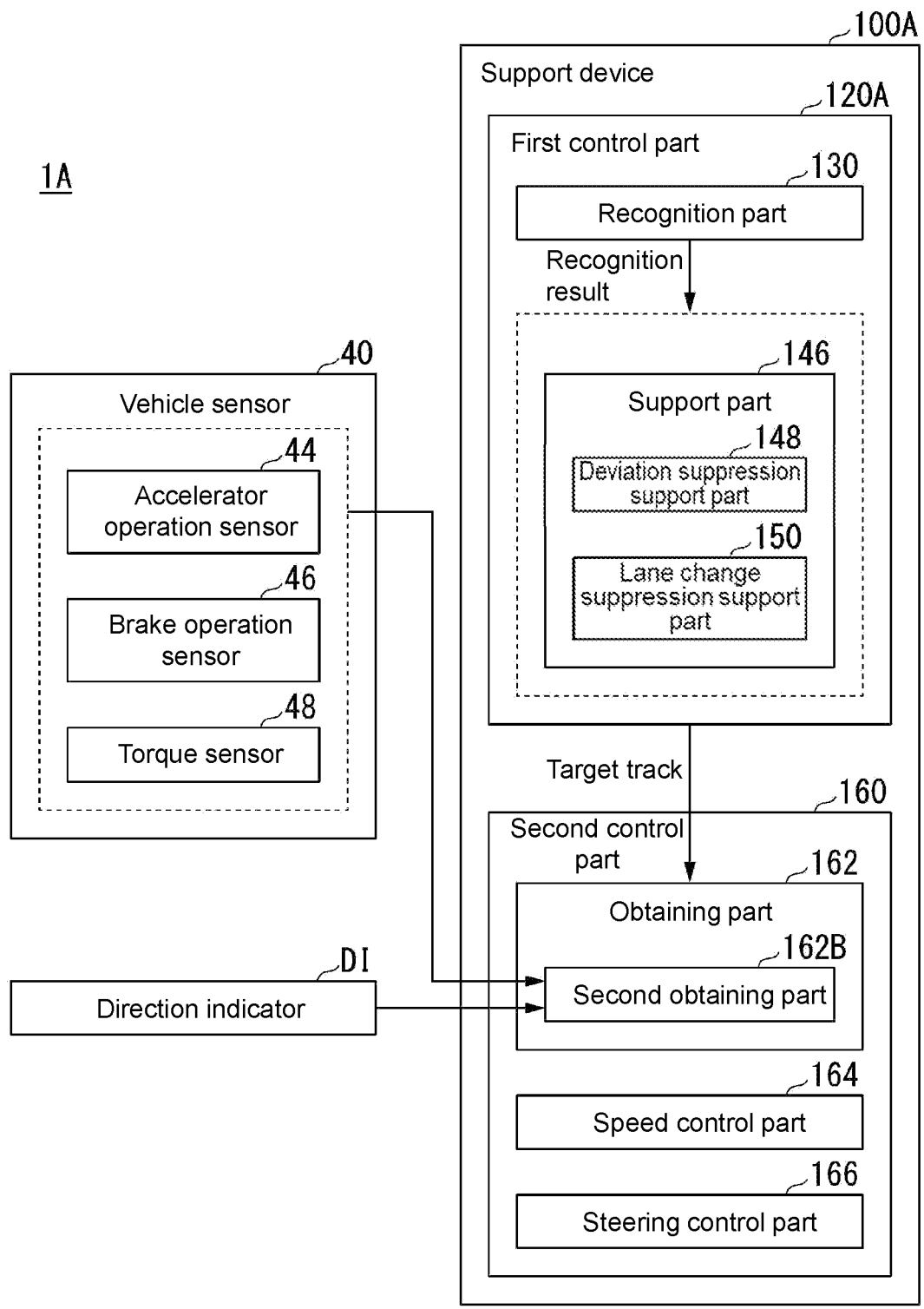
FIG. 9 is a diagram showing an example of a functional configuration centered on the support device 100A.

A vehicle system 1A of the second embodiment includes a support device 100A instead of the automatic driving control device 100. FIG. 9 is a diagram showing an example of a functional configuration centered on the support device 100A. In the vehicle system 1A, the grip sensor 42 is omitted. The support device 100A includes, for example, a first control part 120A and the second control part 160. The first control part 120A includes, for example, the recognition part 130 and the support part 146. Each of the recognition part 130, the support part 146 (the deviation suppression support part 148 and the lane change suppression support part 150), and the second control part 160 has the same functional configuration as each of the recognition part 130, the support part 146 (the deviation suppression support part 148 and the lane change suppression support part 150), and the second control part 160 of the automatic driving control device 100. However, in the obtaining part 162 of the second control part 160, the first obtaining part 162A is omitted.

[Flowchart]

Figure 10:
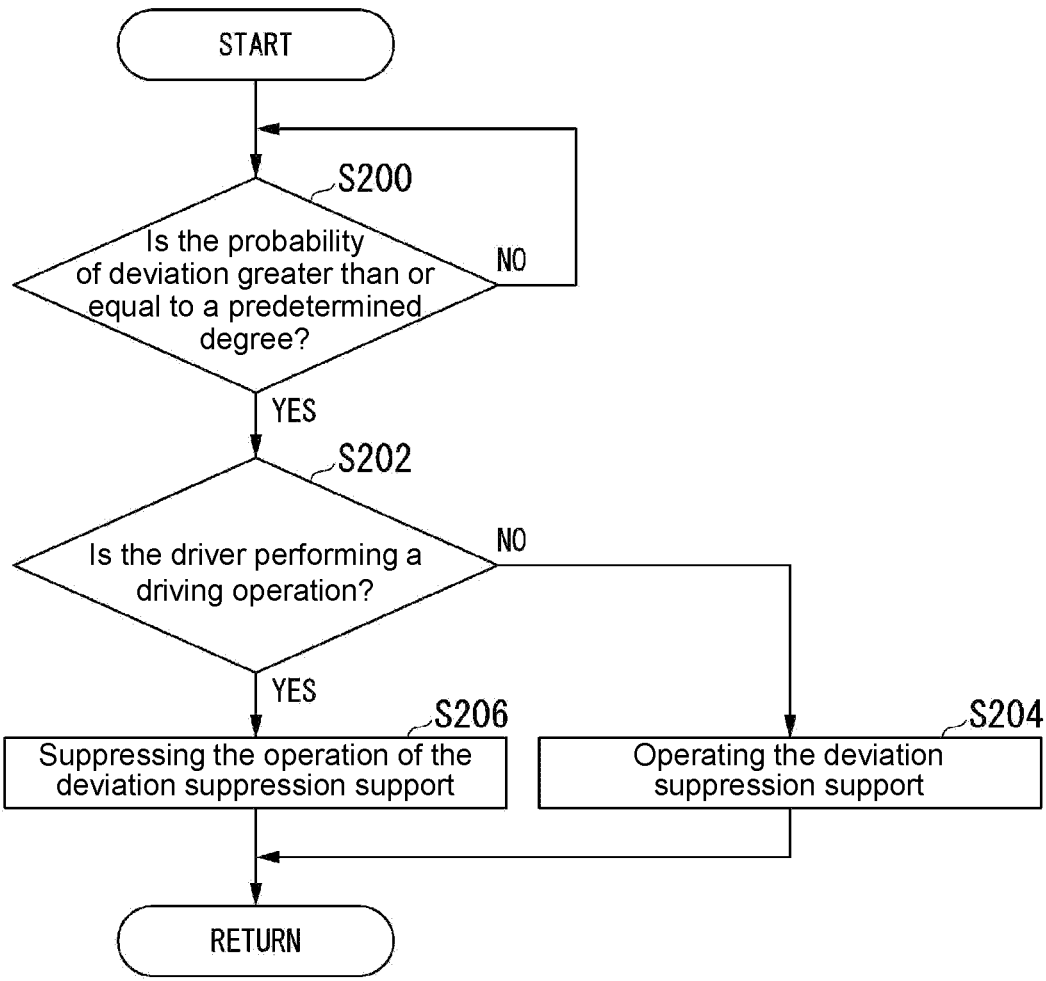
FIG. 10 is a flowchart showing an example of a processing flow executed by the support part 146 of the second embodiment.

FIG. 10 is a flowchart showing an example of a processing flow executed by the support part 146 of the second embodiment. First, the support part 146 determines whether the probability that the vehicle M deviates from the lane is greater than or equal to a predetermined degree (step S200). When the probability that the vehicle M deviates from the lane is greater than or equal to a predetermined degree, the second control part 160 determines whether the driver is performing a driving operation (step S202).

When the driver is performing the driving operation, the second control part 160 suppresses the operation of the deviation suppression support (step S206). The second control part 160 executes the same processing as the processing of step S110 of FIG. 5.

When the driver is not performing the driving operation, the support part 146 operates the deviation suppression support (step S204). At this time, the support part 146 executes the same processing as the processing of step S106 of FIG. 5 or step S108 of FIG. 5. Further, the support part 146 may execute a processing different from the processing of step S106 of FIG. 5 or step S108 of FIG. 5. The different processing may be, for example, a processing having a smaller degree of suppression than the processing of step S110.

After the processing of step S204 or step S206, the processing of one routine of this flowchart ends.

Further, the vehicle system 1A of the second embodiment may include the grip sensor 42 and the second obtaining part 162B, and may perform the same processing as the processing of the flowchart of FIG. 5.

According to the second embodiment described above, the support device 100A can suppress giving a sense of discomfort to the occupant by providing the support so that the vehicle M does not deviate from the road marking line when the probability that the vehicle M deviates from the road marking line is greater than or equal to a predetermined degree, and by suppressing the operation of the support when the operation information is obtained as compared with the case where the operation information is not obtained.

Modified Example of the Second Embodiment

In the second embodiment, the operation of the deviation suppression support is delayed when the operation information is obtained. However, instead of delaying, when the operation information is obtained, the support part 146 may reduce the output degree of the alarm or reduce the steering control amount as compared with the case where the operation information is not obtained.

[Hardware Configuration]

Figure 11:
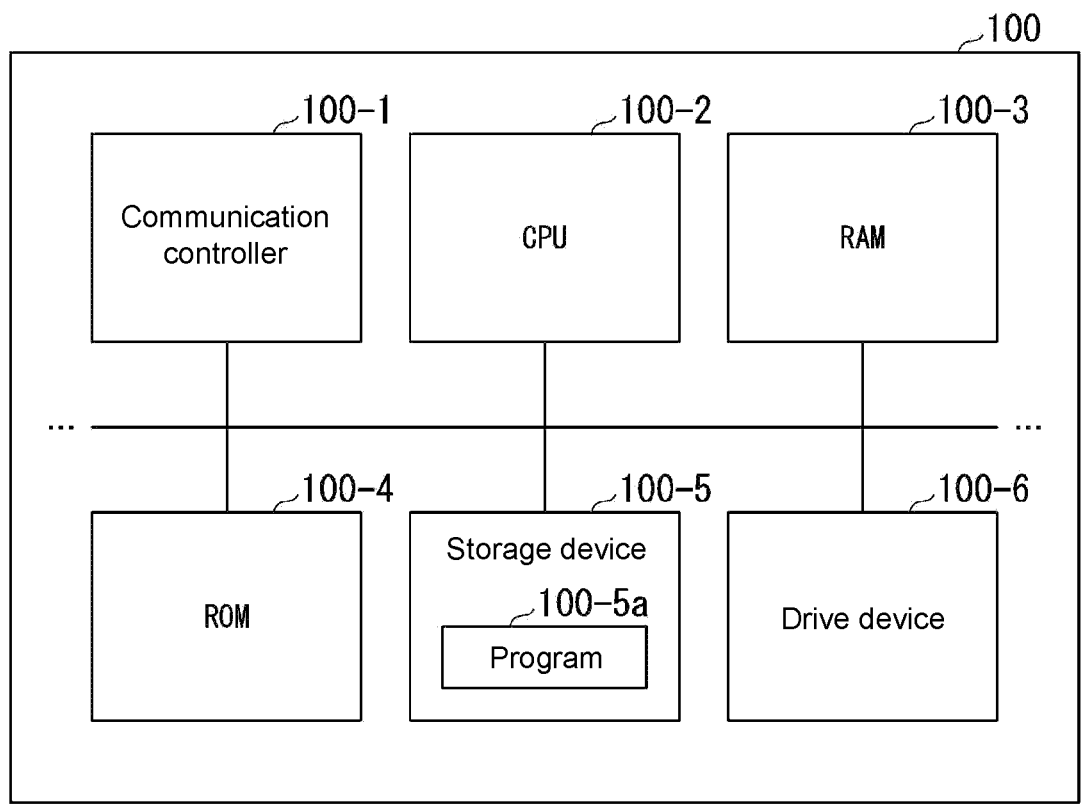
FIG. 11 is a diagram showing an example of a hardware configuration of the automatic driving control device 100 of the embodiment.

FIG. 11 is a diagram showing an example of a hardware configuration of the automatic driving control device 100

(the support device 100A) of the embodiment. As shown in the figure, the automatic driving control device 100 has a configuration in which a communication controller 100-1, a CPU 100-2, a random access memory (RAM) 100-3 used as a working memory, a read only memory (ROM) 100-4 for storing a boot program and the like, a storage device 100-5 such as a flash memory and or a hard disk drive (HDD), a drive device 100-6, and the like are connected to one another by an internal bus or a dedicated communication line. The communication controller 100-1 communicates with a component in addition to the automatic driving control device 100. The storage device 100-5 stores a program 100-5*a* to be executed by the CPU 100-2. This program is expanded in the RAM 100-3 by a direct memory access (DMA) controller (not shown) or the like, and is executed by the CPU 100-2. In this way, a part or all of the first control part 120, the second control part 160, and the functional parts included therein are realized.

The embodiment described above can be expressed as follows.

A vehicle control device includes:
a storage device that stores a program; and
a hardware processor;
when the hardware processor executes the program stored in the storage device, it is made to:
recognize a road marking line of a lane in which a vehicle travels;
provide a support so that the vehicle does not deviate from the road marking line when a probability that the vehicle deviates from the road marking line is greater than or equal to a predetermined degree;
when gripping information indicating that a driver of the vehicle is gripping a steering wheel is obtained and operation information indicating that the driver is performing an operation related to driving the vehicle is not obtained, delay an operation of the support as compared with a case where the gripping information and the operation information are not obtained; and
when the operation information is obtained, suppress the operation of the support for a predetermined time regardless of whether the gripping information is obtained.

Although embodiments for implementing the disclosure have been described above by the embodiments, the disclosure is not limited to these embodiments, and various modifications and replacements may be added without departing from the spirit of the disclosure.

What is claimed is:

1. A vehicle control device, comprising:
a storage device; and
a hardware processor coupled to the storage device and configured to:
obtain gripping information indicating that a driver of a vehicle is gripping a steering wheel;
obtain operation information indicating that the driver is performing an operation related to driving the vehicle, wherein the operation information indicates at least one of an operation of controlling acceleration and deceleration of the vehicle, an operation of controlling braking of the vehicle, or an operation of the steering wheel of the vehicle;
recognize a road marking line of a lane in which the vehicle travels; and
provide a support of the vehicle by controlling the vehicle to not deviate from the road marking line when a probability that the vehicle deviates from the road marking line is greater than or equal to a predetermined degree,
wherein when the gripping information is obtained and the operation information is not obtained, the hardware processor delays an operation of the support as compared with a case where the gripping information and the operation information are not obtained, and
when the operation information is obtained, the hardware processor suppresses the operation of the support for a predetermined time regardless of whether the gripping information is obtained.

2. The vehicle control device according to claim 1, wherein the operation related to driving comprises an operation of operating a direction indicator, the operation of controlling acceleration and deceleration of the vehicle, the operation of controlling braking of the vehicle, and the operation of the steering wheel of the vehicle.

3. The vehicle control device according to claim 2, wherein
when operation information indicating that the direction indicator has been operated is obtained,
the hardware processor suppresses the operation of the support with the predetermined time set to a longer time as compared with a case where the operation information indicating one or more of the operation of controlling the acceleration and deceleration of the vehicle, the operation of controlling the braking of the vehicle, or the operation of the steering wheel of the vehicle is obtained.

4. The vehicle control device according to claim 1, wherein the operation related to driving comprises the operation of controlling acceleration and deceleration of the vehicle, the operation of controlling braking of the vehicle, or the operation of the steering wheel of the vehicle.

5. The vehicle control device according to claim 4, wherein
when the operation information indicating the operation of controlling the braking of the vehicle is obtained,
the hardware processor suppresses the operation of the support with the predetermined time set to a longer time as compared with a case where the operation information indicating the operation of controlling the acceleration and deceleration of the vehicle or the operation of the steering wheel of the vehicle is obtained.

6. The vehicle control device according to claim 1, wherein the hardware processor provides the support so that the vehicle does not deviate from the road marking line when the probability that the vehicle deviates from the road marking line is greater than or equal to the predetermined degree after the predetermined time elapses.

7. The vehicle control device according to claim 2, wherein the hardware processor provides the support so that the vehicle does not deviate from the road marking line when the probability that the vehicle deviates from the road marking line is greater than or equal to the predetermined degree after the predetermined time elapses.

8. The vehicle control device according to claim 3, wherein the hardware processor provides the support so that the vehicle does not deviate from the road marking line when the probability that the vehicle deviates from the road marking line is greater than or equal to the predetermined degree after the predetermined time elapses.

9. The vehicle control device according to claim 4, wherein the hardware processor provides the support so that the vehicle does not deviate from the road marking line when the probability that the vehicle deviates from the road marking line is greater than or equal to the predetermined degree after the predetermined time elapses.

10. The vehicle control device according to claim 5, wherein the hardware processor provides the support so that the vehicle does not deviate from the road marking line when the probability that the vehicle deviates from the road marking line is greater than or equal to the predetermined degree after the predetermined time elapses.

11. The vehicle control device according to claim 1, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

12. The vehicle control device according to claim 2, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

13. The vehicle control device according to claim 3, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

14. The vehicle control device according to claim 4, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

15. The vehicle control device according to claim 5, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

16. The vehicle control device according to claim 6, wherein the operation information is a plurality pieces of information comprising information indicating an operation of operating a direction indicator, information indicating an operation of controlling acceleration and deceleration of the vehicle, information indicating an operation of controlling braking of the vehicle, and information indicating an operation of a steering wheel of the vehicle, and
when suppressing the operation of the support, the hardware processor varies a degree of the suppression according to a type of the operation information.

17. A vehicle control method, wherein a computer:
recognizes a road marking line of a lane in which a vehicle travels;
provides a support of the vehicle by controlling the vehicle to not deviate from the road marking line when a probability that the vehicle deviates from the road marking line is greater than or equal to a predetermined degree;
when gripping information indicating that a driver of the vehicle is gripping a steering wheel is obtained and operation information indicating that the driver is performing an operation related to driving the vehicle is not obtained, delays an operation of the support as compared with a case where the gripping information and the operation information are not obtained, wherein the operation information indicates at least one of an operation of controlling an acceleration or a deceleration of the vehicle, an operation of controlling a braking of the vehicle, or an operation of the steering wheel of the vehicle; and
when the operation information is obtained, suppresses the operation of the support for a predetermined time regardless of whether the gripping information is obtained.

18. A non-transitory computer-readable recording medium recording a program, wherein a computer is made to perform:
a processing of recognizing a road marking line of a lane in which a vehicle travels;
a processing of providing a support of the vehicle by controlling the vehicle to not deviate from the road marking line when a probability that the vehicle deviates from the road marking line is greater than or equal to a predetermined degree;
when gripping information indicating that a driver of the vehicle is gripping a steering wheel is obtained and operation information indicating that the driver is performing an operation related to driving the vehicle is not obtained, a processing of delaying an operation of the support as compared with a case where the gripping information and the operation information are not obtained, wherein the operation information indicates at least one of an operation of controlling an acceleration or a deceleration of the vehicle, an operation of controlling a braking of the vehicle, or an operation of the steering wheel of the vehicle; and
when the operation information is obtained, a processing of suppressing the operation of the support for a predetermined time regardless of whether the gripping information is obtained.

* * * * *